(12) United States Patent
Wechsler

(10) Patent No.: US 10,292,367 B2
(45) Date of Patent: May 21, 2019

(54) LEASH HANDLE WITH HANDS-FREE FEATURE

(71) Applicant: Lawrence I. Wechsler, Great Neck, NY (US)

(72) Inventor: Lawrence I. Wechsler, Great Neck, NY (US)

(*) Notice: Subject to any disclaimer, the term of this patent is extended or adjusted under 35 U.S.C. 154(b) by 1156 days.

(21) Appl. No.: 13/756,555

(22) Filed: Feb. 1, 2013

(65) Prior Publication Data

US 2014/0216359 A1   Aug. 7, 2014

(51) Int. Cl.
 *A01K 27/00*   (2006.01)
(52) U.S. Cl.
 CPC ................... *A01K 27/003* (2013.01)
(58) Field of Classification Search
 CPC ....... A01K 27/003; B65D 25/30; B65D 25/28
 USPC .......................................... 119/795
 See application file for complete search history.

(56) References Cited

U.S. PATENT DOCUMENTS

| 3,603,295 | A | * | 9/1971 | Shuman | 119/795 |
| 4,729,345 | A | * | 3/1988 | Anderson | A01K 27/00 |
| | | | | | 119/770 |
| 5,839,394 | A | * | 11/1998 | Dickison | 119/795 |
| 6,089,193 | A | * | 7/2000 | Paglericcio | 119/795 |
| 8,104,145 | B1 | * | 1/2012 | Hajianpour | 16/428 |
| D747,879 | S | * | 1/2016 | Fair | D3/318 |
| D809,858 | S | * | 2/2018 | Gonzalez | D7/394 |
| 2006/0185618 | A1 | * | 8/2006 | Hetland | A01K 27/003 |
| | | | | | 119/795 |
| 2008/0216767 | A1 | * | 9/2008 | Wang | 119/795 |
| 2010/0199926 | A1 | * | 8/2010 | McCullough et al. | 119/795 |

* cited by examiner

*Primary Examiner* — Kristen C Hayes

(57) ABSTRACT

A handle structure includes a loop portion through which a hand of a user is insertable, and which is dimensioned and configured such that once the hand is inserted, the wrist of the user is retained captively within the loop portion such that a controlled tether is maintained without requiring grasping by the fingers of the user.

5 Claims, 3 Drawing Sheets

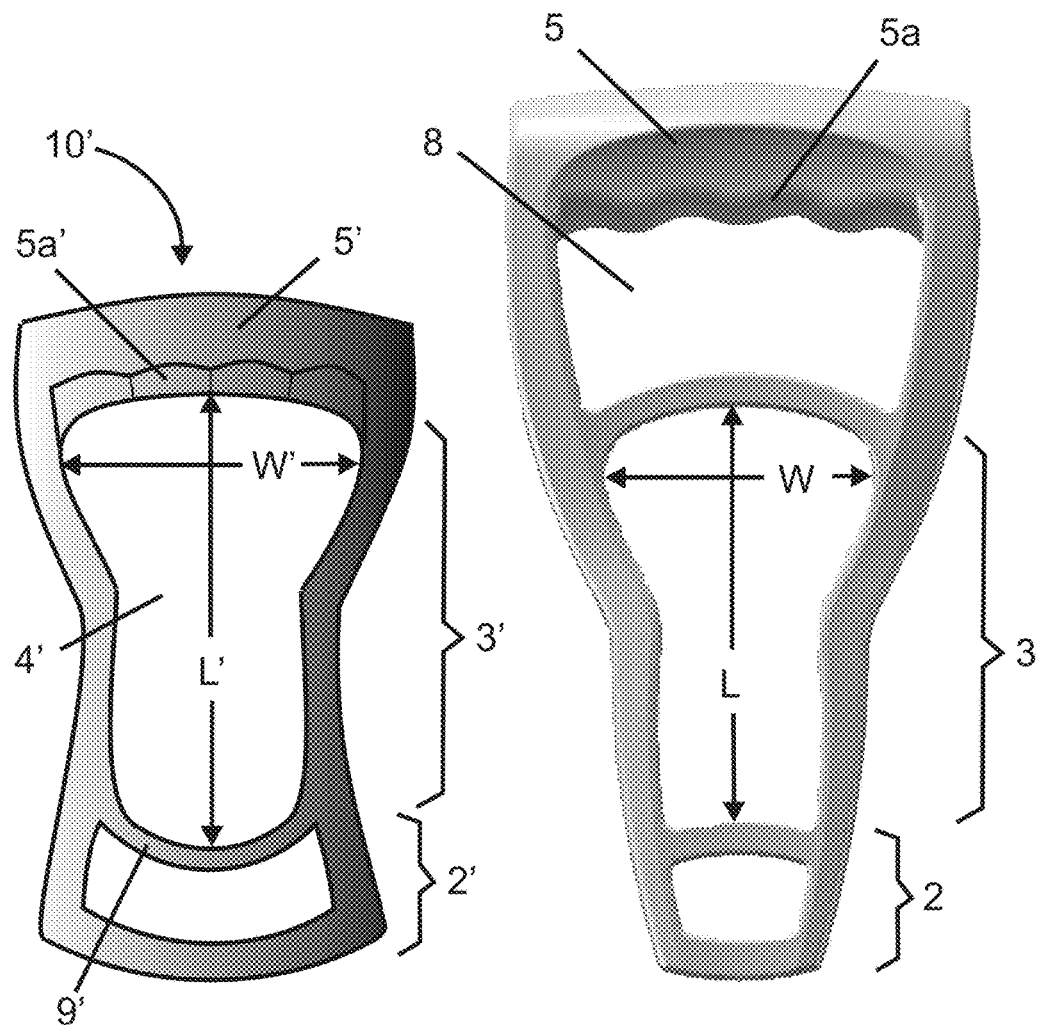

LEASH HANDLE WITH HANDS-FREE FEATURE

CROSS REFERENCE TO RELATED APPLICATIONS

This application claims the benefit of U.S. Provisional Application No. 61/594,388 filed Feb. 3, 2012 entitled LEASH HANDLE WITH HANDS-FREE FEATURE.

BACKGROUND OF THE INVENTION

The present invention relates to a leash handle accessory, and more particularly to a leash handle accessory for attachment to a leash for allowing hands-free tethered control of a pet by a user.

Commonly available leashes generally have a looped end adapted for grasping by a pet owner during walks. Being comprised of leather or fabric straps, these do not always provide the level of comfort or control desired. Moreover, they do not generally afford the option of easily retaining tethered control of the pet while freeing up the hand, particularly the fingers of the pet owner, so as to allow use of the hand, for such things as, for example, applying hand sanitizer after picking up dog waste.

It would, therefore, be desirable to provide a handle accessory which would be configured to allow a tethered condition of pet to owner to be maintained without requiring a typical gripping of a handle, thereby freeing up the fingers of the user.

SUMMARY OF THE INVENTION

An object of the invention is therefore to provide a leash handle accessory which allows hands-free control of a dog tethered to the owner/walker by a leash.

This object is achieved, in accordance with an embodiment of the invention, by a handle structure which includes a loop portion through which the hand of the user is insertable, and which is dimensioned and configured such that once the hand is inserted, the wrist of the user is retained captively within the loop portion such that a controlled tether is maintained without requiring grasping by the fingers of the user.

Advantageously, a handle grip can also be optionally provided, thereby giving the user the option of gripping the leash handle accessory comfortably, when not using the hands-free feature.

The above, and other objects, features and advantages of the present invention will become apparent from the following description read in conjunction with the accompanying drawings.

BRIEF DESCRIPTION OF THE DRAWINGS

FIG. 4A is another embodiment of a leash handle accessory according to the invention in which the optional crosspiece and grip are combined; and FIG. 4B is a comparative illustration of the embodiment of FIG. 1.

DETAILED DESCRIPTION OF THE PREFERRED EMBODIMENT

Figure 1:
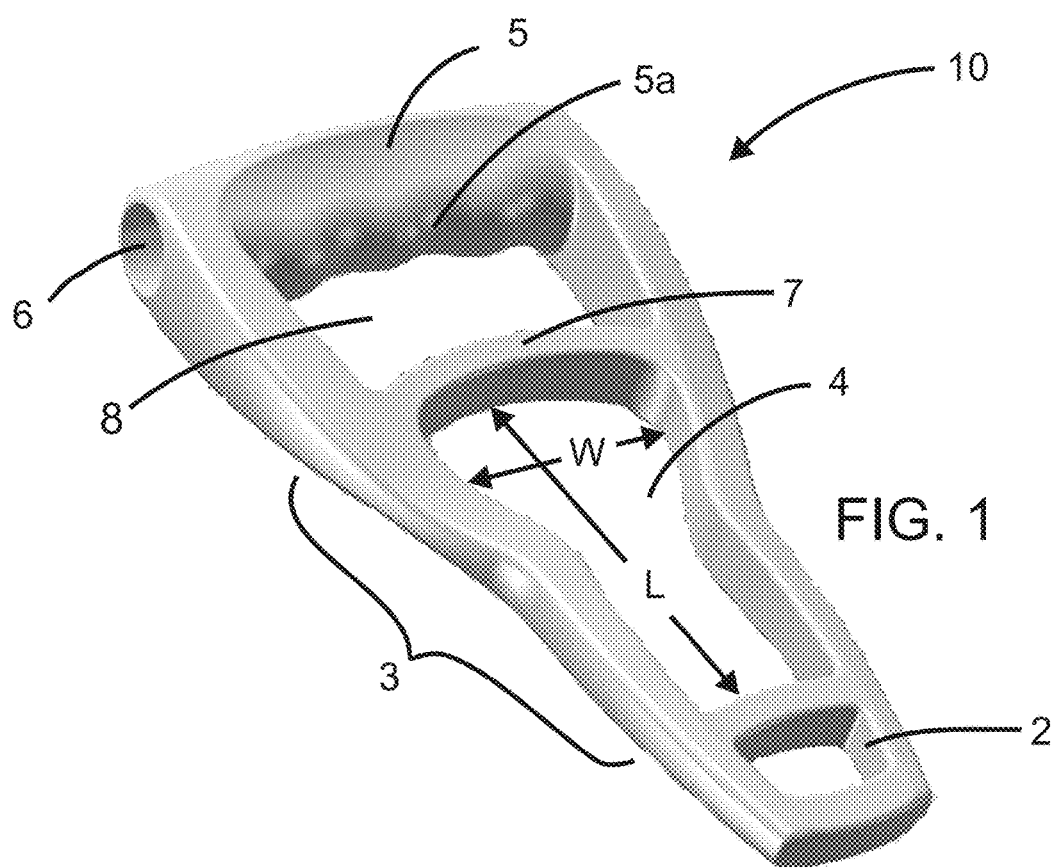
FIG. 1 is perspective view of an embodiment of a leash handle accessory according to the invention.

Referring now to FIG. 1, an embodiment of a leash handle accessory according to the invention is depicted generally at 10. The leash handle accessory 10 optionally includes a leash tethering portion 2 through which a leash (not shown) may be looped through and tied in suitable fashion to be retained to the leash handle accessory 10. The invention also contemplates any other form of attachment of leash to the leash handle accessory, for example, utilizing a carabiner clip, tie or the like.

A hands-free portion 3 is provided and defines a hand reception opening 4, through which a hand of a user is receivable, in a manner as will be described in detail below, with reference to FIGS. 1 and 2.

Optionally, as shown in the depicted example, the leash handle accessory 10 further includes a grip 5 configured to advantageously provide a comfortable hand grip when the hands-free feature is not being utilized. Grip 5 advantageously includes an ergonomic region 5a which is configured to provide enhanced comfort when grip 5 is held by the user. The fingers of the gripping hand of the user are received in a fingers receiving opening 8 located forward of grip 5. A hole 6 extending at least partially through the grip 5 advantageously provides a storage region for waste bags or hand sanitizer, and also reduces required material for lighter weight and greater economy.

In the depicted embodiment of FIG. 1, in which an optional grip is provided, the fingers receiving opening 8 is separated from the hand reception opening 4 by a crosspiece 7 which runs generally crosswise to the longitudinal extent of the leash handle accessory 10, and forms a portion of a boundary defining a shape of hand reception opening 4.

Figure 2:
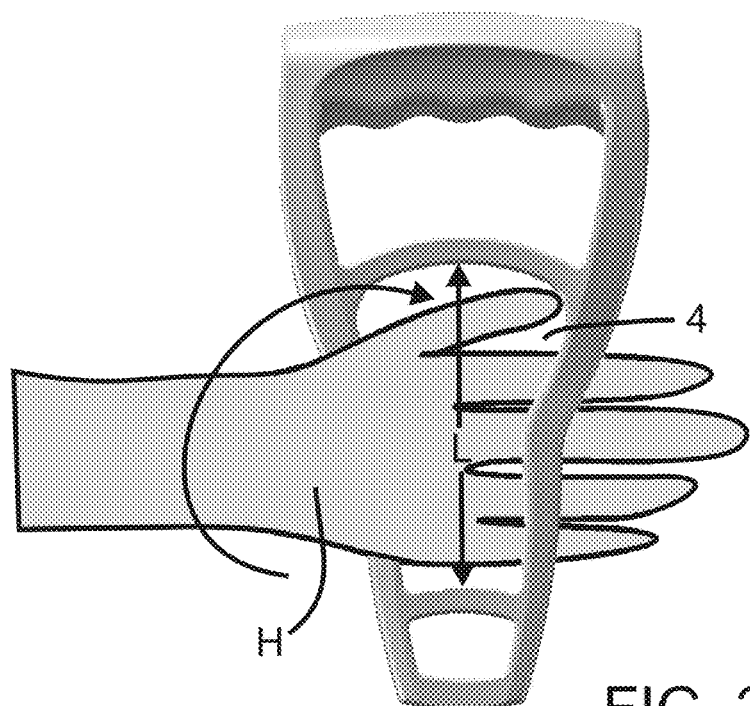
FIG. 2 is a schematic plan view of the embodiment of FIG. 1 depicting insertion of a hand through a hand-free portion of the leash handle accessory.
Figure 3:
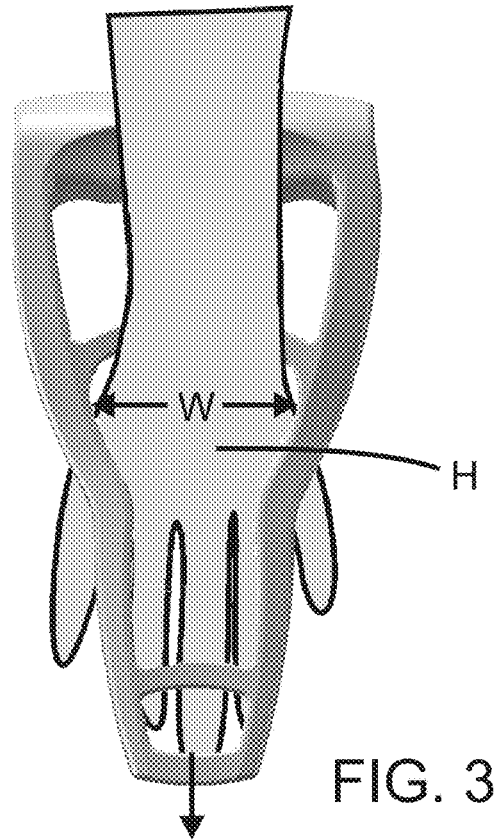
FIG. 3 is a schematic plan view of the embodiment of FIG. 1 depicting orientation of the hand to provide hands-free operation after being reoriented from the position in FIG. 2.

Turning now to FIGS. 2 and 3, an example of the manner in which the hands-free functionality is employed is explained.

Initially, as shown in FIG. 2, a hand H of the user is inserted through the hand reception opening 4 with the width of the hand H oriented along the length L of the hand reception opening 4, and the palm advantageously facing downward, (away from the viewer, as illustrated). Once inserted, the hand H, with the palm still facing downward, is rotated into the position shown in FIG. 3, in which the width of the wrist of the hand H extends across the width W of the hand reception opening 4.

Hand reception opening 4 is advantageously configured such that the entire hand H width is accommodatable therethrough in a length dimension L of the hand reception opening 4 when oriented as shown in FIG. 2 relative to the hand reception opening 4, and such that when oriented as shown in FIG. 3, while the width of the wrist extends across the width of the hand reception opening 4, advantageously of approximate matching dimension, the width of the hand H exceeds the width dimension W of the hand reception opening 4, thereby inhibiting unintentional detachment of the leash handle accessory 10 from the hand H when the pet pulls in the direction of the arrow shown in FIG. 3. This leaves the fingers of the hand, extending downward though the hand reception opening, fully functional for a required task.

It will be understood that when leash handle accessory 10 is comprised of an elastomer, which allows the length dimension L and the width dimension W to be enlarged by stretching, these two dimensions can actually be dimensioned smaller than the corresponding hand/wrist dimensions, and still provide proper function according to the invention and within the scope thereof.

While the hand reception opening 4 can be a simple rectangle, triangle or oval, or other suitable shape, thereby meeting the functional requirement outlined above, in the depicted embodiment, the hand reception opening is advantageously key-hole shaped, that is, defined by two regions of differing width arranged sequentially along the longitudinal direction of the leash handle accessory 10.

As noted above, the grip portion need not be provided at all. Nor does a dedicated leash tethering portion 2 providing physical separation of the hand reception opening therefrom, have to be provided. In such instance, only structure defining the hand reception opening 4 would be present, and a leash could be simply tied to a forward portion of the encircling structure defining the hand reception opening 4.

In accordance with an alternative embodiment, crosspiece 7 can be fashioned into a suitable form to operate as a hand grip when grip 5 is not provided. Such an embodiment is illustrated in FIG. 4A, shown by comparison with the embodiment of FIG. 1 shown side by side in FIG. 4B.

As shown in FIG. 4A, a leash handle accessory 10' includes a hands-free portion 3' which is configured to define a hand reception opening 4', through which a hand of a user is receivable in like manner as to what was described with respect to the embodiments of FIGS. 1-3. The crosspiece 7 and grip 5 of the embodiment of FIG. 1 are combined to form a grip/crosspiece 5' which similarly includes, as an advantageous optional feature, an ergonomic region 5a' which is configured to provide enhanced comfort when grip/crosspiece 5' is held by the user.

A leash tethering portion 2' through which a leash (not shown) may be looped through and tied in suitable fashion to be retained to the leash handle accessory 10' is optionally provided in the form as shown, in which the leash is advantageously isolated by a physical separation 9' from the hand reception opening 4', analogous with the embodiment of FIG. 1.

The resultant structure of the embodiment of FIG. 4A, which analogously includes a hand reception opening 4' having a corresponding length dimension L' and width dimension W', is more compact than the embodiment of FIG. 1, shown for comparison purposes in FIG. 4B. This will save on cost of materials, and provide a lighter, more easily storable/transportable product.

Any suitable material(s) can be used to manufacture the leash handle accessory. For example, as noted above, a suitable elastomer such as natural or synthetic rubber, can be advantageously used. Alternatively, the leash handle accessory according to the invention can be comprised of non-elastic material, or a combination of elastic and non-elastic components.

As a further option, the leash handle accessory can be comprised of a material in which a glow-in-the-dark component or additive is incorporated, so that enhanced visibility in low light conditions is achieved.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A leash handle, comprising:
structure defining a loop portion through which a hand of a user is insertable, and which is dimensioned and configured such that once the hand is inserted and reoriented, a wrist of the user is retained captively within the loop portion such that a controlled tether is maintained without requiring grasping by fingers of the user.

2. A method of providing hand-free tethering of a user to a pet, comprising:
providing structure defining a loop portion through which a hand of the user is insertable, and which is dimensioned and configured such that once the hand is inserted and reoriented, a wrist of the user is retained captively within the loop portion such that a controlled tether is maintained without requiring grasping by fingers of the user;
inserting the hand of the user through the loop portion in a first orientation relative to the loop portion; and
reorienting the hand of the user into a second orientation relative to the loop portion.

3. A method according to claim 2, wherein:
said inserting the hand of the user includes orienting a width of the hand along a length dimension of an opening in the loop portion; and
said reorienting the hand of the user includes orienting a width of the wrist in a width dimension of the opening in the loop portion.

4. A method according to claim 2, wherein:
the loop portion comprises an elastomer; and
said inserting the hand of the user includes stretching the loop portion to enlarge an opening therein to accommodate insertion of the hand of the user.

5. A leash handle, comprising: a hands-free structural portion including a proximal region and a distal region, with a leash tethering portion adjacent to said distal region defining an opening trough through which a leash can be looped and tied, said hands-free structural portion being comprised of a form retaining material defining a hand reception opening, said hand reception opening including a length dimension and a width dimension crosswise thereto, said length dimension being sufficiently sized to allow passage of a width of a hand of a user therethrough, said width dimension having a maximum width smaller than said length dimension and narrower than the width of the hand of the user, said width dimension in at least one region of said hands-free structural portion being sufficiently wide to accommodate a width of a wrist of the user, whereby when the hand is inserted through the hand reception opening with the width of the hand generally aligned with said length dimension and rotated to a crosswise direction generally aligned with said width dimension in said at least one region, the wrist of the user is accommodated therein and unintentional detachment of the leash handle from the hand is inhibited by the width of the hand which is greater than that of the width dimension.

* * * * *